United States Patent [19]

Yajima et al.

[11] 4,220,600
[45] Sep. 2, 1980

[54] POLYCARBOSILANE, PROCESS FOR ITS PRODUCTION, AND ITS USE AS MATERIAL FOR PRODUCING SILICON CARBIDE FIBERS

[75] Inventors: Seishi Yajima; Kiyohito Okamura; Yoshio Hasegawa, all of Oharai, Japan

[73] Assignee: The Foundation: The Research Institute for Special Inorganic Materials, Asahi, Japan

[21] Appl. No.: 953,518

[22] Filed: Oct. 23, 1978

[30] Foreign Application Priority Data

Oct. 26, 1977 [JP] Japan ............................... 52/127629
Oct. 26, 1977 [JP] Japan ............................... 52/127630
Dec. 10, 1977 [JP] Japan ............................... 52/148488

[51] Int. Cl.$^2$ .................................................. C07F 7/08
[52] U.S. Cl. .................................. 556/434; 423/345
[58] Field of Search ................................. 260/448.2 D

[56] References Cited

U.S. PATENT DOCUMENTS 4,052,930  10/1977  Yajima et al. ................. 260/448.2 D

*Primary Examiner*—Paul F. Shaver
*Attorney, Agent, or Firm*—Ladas & Parry

[57] ABSTRACT

A process for producing polycarbosilane partly containing siloxane bonds, which comprises adding 0.01 to 15% by weight of polyborosiloxane having phenyl groups in at least a part of the side chains of Si with its skeletal structure being composed of B, Si and O to a polysilane having the structure

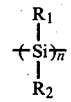

wherein n is at least 3, and $R_1$ and $R_2$, independently from each other, represent methyl, ethyl, phenyl or hydrogen; and heating the polymer mixture in an atmosphere inert to the reaction thereby to polymerize it. The polycarbosilane has excellent properties, and is especially suitable as a raw material for the production of silicon carbide fibers.

7 Claims, 6 Drawing Figures

POLYCARBOSILANE, PROCESS FOR ITS PRODUCTION, AND ITS USE AS MATERIAL FOR PRODUCING SILICON CARBIDE FIBERS

FIELD OF THE INVENTION

This invention relates to novel polycarbosilane and a process for producing it; novel silicon carbide fibers of good quality produced from the polycarbosilane and a process for producing the silicon carbide fibers; and to novel polysilane suitable as a material for the production of the polycarbosilane, and a process for producing the polysilane.

BACKGROUND OF THE INVENTION

Polycarbosilane is a polymer having a skeletal structure composed substantially of recurring units expressed by the formula

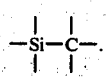

Since this polymer changes to silicon carbide (SiC) by firing, it is used as a raw material for the production of SiC which is utilized as fibers, films, coatings, sintering agents, impregnating agents, powders, etc.

Known polycarbosilanes include two species, one being polycarbosilane prepared by polymerizing monosilane, and the other being polycarbosilane obtained by converting monosilane to polysilane and polymerizing it. The former can be produced by the method disclosed, for example, in Fritz, Angew. Chem. 79, p. 657 (1967), and the latter can be produced by the method disclosed in U.S. Pat. No. 4,052,430 to the same inventors as the present application. Production of polycarbosilane having superior thermal stability and oxidation resistance and a high residual ratio on firing in a non-oxidizing atmosphere by conventional methods requires the use of a pressure reactor such as an autoclave or a circulating-type apparatus which permits recycling. According to a method utilizing the pressure reactor, the reaction must be carried out at a temperature of 400° to 470° C. and a pressure of 80 to 110 atmospheres for a period of 10 to 15 hours, and the provision of a pressure-resistant equipment and measures against a danger of fire are essential. Another defect is that this method is not suitable for mass production. According to a method using the circulating-type apparatus, it is necessary to use an apparatus including a heat reaction tower, a product-separating tower, etc., and low-molecular-weight products must be forcibly recycled for repeated reaction in the heat reaction tower. Thus, the temperature must be raised to as high as 600° to 800° C., and the reaction time must be as long as 20 to 50 hours. The latter method is therefore industrially disadvantageous in many respects.

The present inventors made extensive investigations to remove the aforesaid defects of the prior art, and consequently discovered a novel and advantageous process for producing polycarbosilane from polysilane at low heating temperatures within relatively short periods of time without the need for any special apparatus such as a pressure vessel or a recycle-type apparatus. The present inventors also found that the polycarbosilane obtained by this process is a novel polymer having better thermal stability and oxidation resistance and a higher residual ratio on firing in a non-oxidizing atmosphere than the polycarbosilanes obtained by the aforesaid prior methods.

The present inventors also found that this polycarbosilane is a very suitable material for silicon carbide fibers.

In the specification of U.S. patent application Ser. No. 677,960 filed on Apr. 19, 1976, the present inventors disclosed a process for producing silicon carbide fibers from polycarbosilane obtained by a prior art method, which comprises removing low-molecular-weight compounds from polycarbosilane to reduce the content of these compounds to 10% or less, preparing a spinning dope of the polycarbosilane, spinning the dope to form fibers, subjecting the fibers to a treatment of rendering them infusible, and firing the treated fibers at high temperatures to convert them to silicon carbide fibers. The fibers obtained by spinning in this process are so brittle that they are difficult to handle. The brittleness of these fibers can be reduced to some extent by rendering them infusible, but their tensile properties are still poor with a tensile strength of less than 3.0 kg/mm² and a break elongation of 2%. As a result, breaking of the fibers tends to occur frequently, and the infusible fibers are difficult to handle. Moreover, breaking of fibers tends to occur in the final firing step. In contrast, when silicon carbide fibers are produced from the polycarbosilane obtained by the process newly discovered by the present inventors which have superior thermal stability and oxidation resistance and a high residual ratio on firing in a non-oxidizing atmosphere, the above defects of the prior art methods can be markedly remedied, and because of the high residual ratio on firing of the polycarbosilane, the yield of the silicon carbide fibers increases greatly. In addition to this advantage, the process of this invention can permit the omission of a step of removing low-molecular-weight compounds which is essential in the prior art methods. This brings about the advantage that silicon carbide fibers can be produced economically.

As stated above, the process for producing polycarbosilane discovered by the present inventors which does not require a pressure vessel or a circulating-type apparatus has many advantages. If required, however, polycarbosilane may be produced from polysilane by using a pressure vessel in this process. The present inventors have found that polysilane whose side chains bonded to the silicon atom consist of 1 to 50% of phenyl groups and the balance being methyl groups is an especially preferred starting material in this case.

SUMMARY OF THE INVENTION

According to this invention, there is provided a process for producing polycarbosilane partly containing siloxane bonds, which comprises adding 0.01 to 15% by weight of polyborosiloxane having phenyl groups in at least a part of the side chains of Si with its skeletal structure being composed of B, Si and O to a polysilane having the structure

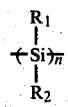

wherein n is at least 3, and $R_1$ and $R_2$, independently from each other, represent methyl, ethyl, phenyl or hydrogen; and heating the polymer mixture in an atmosphere inert to the reaction thereby to polymerize it.

The polycarbosilane obtained by this process is polycarbosilane partly containing siloxane bonds, which is composed mainly of the structural units (A) and (B),

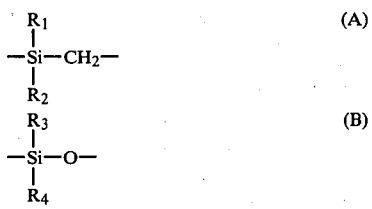

wherein $R_1$, $R_2$, $R_3$ and $R_4$, independently from each other, represent methyl, ethyl, phenyl or hydrogen, the ratio of (A) to (B) being from 5:1 to 200:1, and has a number average molecular weight of 500 to 10,000 and an intrinsic viscosity of 0.01 to 1.50. It possesses superior thermal stability and oxidation resistance and a high residual ratio on firing in a non-oxidizing atmosphere.

According to another aspect of the invention, there is provided a process for producing continuous silicon carbide fibers composed mainly of SiC, which comprises (1) preparing polycarbosilane partly containing siloxane bonds by the process described hereinabove, (2) preparing a spinning dope of the polycarbosilane and spinning the dope, (3) subjecting the resultant fibers to a treatment of rendering them infusible under tension or under no tension, and (4) firing the treated fibers at a temperature of from 800° to 1800° C. in vacuum or in an inert gaseous atmosphere.

The continuous silicon carbide fibers produced by this process are continuous fibers composed mainly of amorphous and/or β-type crystalline ultrafine particles of SiC, contain, by weight percent, 50 to 70 of Si, 30 to 40 of C, 0.01 to 10 of 0, not more than 0.01 of H and not more than 500 ppm of B, and have a specific gravity of 2.3 to 3.1, a tensile strength of 200 to 500 kg/mm² and a Young's modulus of 15 to 40 tons/mm². They have superior thermal stability, oxidation resistance and acid resistance.

According to still another aspect of the invention, there is provided substantially linear polysilane having a skeltal structure of the formula

wherein n is from 5 to 100, with side chains consisting of 1 to 50% of phenyl groups and the balance being methyl groups, a molecular weight of 850 to 13,000, and a heat decomposition initiating temperature in a non-oxidizing atmosphere of at least 200° C.

The polysilane containing phenyl groups as a part of the side chains can be produced by mixing one monosilane of (I) to (V) below, (I) $(CH_3)(C_6H_5)SiCl_2$, (II) a mixture of 1 to 70 mole% of $(CH_3)(C_6H_5)SiCl_2$ and the balance being $(CH_3)_2SiCl_2$, (III) a mixture of 1 to 50 mole% of $(C_6H_5)_2SiCl_2$ and the balance being $(CH_3)_2SiCl_2$, (IV) a mixture of (I) and (III), (V) a mixture of (II) and (III), with at least one metal selected from sodium, lithium and potassium, and heating the mixture to induce dechlorination and polymerization.

DETAILED DESCRIPTION OF THE INVENTION

Figure 1:
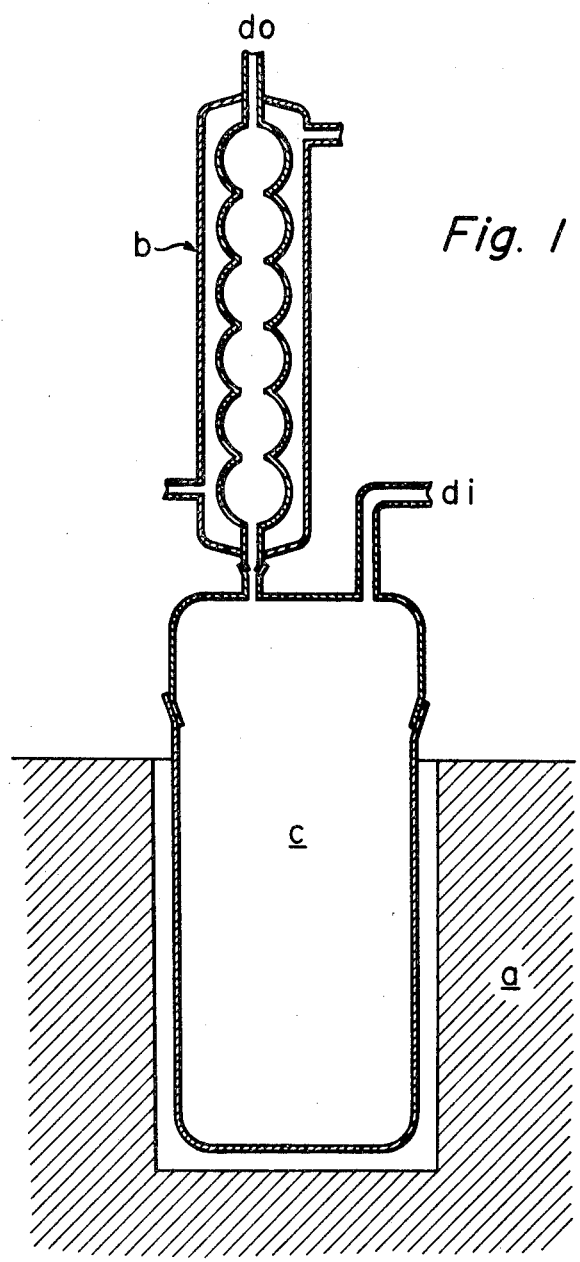
FIG. 1 shows one example of an apparatus used for the production of polycarbosilane by the process of this invention.

The novel process for producing polycarbosilane in accordance with this invention uses polysilane and a specified polyborosiloxane as starting materials.

Polysilane, as one starting material, is a polymer having a structural unit of the formula

wherein n is at least 3, and $R_1$ and $R_2$, independently from each other, represent methyl, ethyl, phenyl or hydrogen. The polysilane may be linear or cyclic or both linear and cyclic. In the above formula, n is at least 3, preferably 5 to 100. $R_1$ and $R_2$ in the side chains, independently from each other, represent methyl, ethyl, phenyl or hydrogen. In other words, $R_1$ and $R_2$ bonded to each Si atom forming the skeleton of the polysilane may be identical to each other or different from each other. When the side chain of the polysilane consists of two or more of methyl, ethyl, phenyl and hydrogen, the order of arrangement of different kinds of side-chain groups in the polysilane may be optional. Polysilane having a structural unit composed only of

and polysilane whose side chains consist of at least 50% of methyl groups and the balance being phenyl groups and/or hydrogen atoms are especially suitable for use as the starting material. Linear polysilane preferably contains hydroxyl or methyl as a terminal group.

Polysilane is usually produced by dechlorinating at least one dichlorosilane with sodium. The dechlorination of one dichlorosilane is schematically shown as follows:

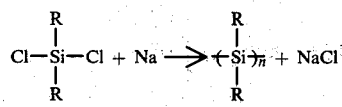

Another starting material used in the production of polycarbosilane in accordance with this invention is polyborosiloxane (to be sometimes referred to hereinbelow as phenyl-containing polyborosiloxane) having a skeletal structure composed of B, Si and O and containing phenyl groups at least as a part of the side chains bonds to Si.

The phenyl-containing polyborosiloxane is disclosed in detail in U.S. patent application Ser. No. 835,373 filed on Sept. 21, 1977 by the present inventors with regard to a method for its production and its structure and properties. A convenient method for producing the phenyl-containing polyborosiloxane is the dehydrochlorination-condensation reaction of boric acid with at least one diorganodichlorosilane (the organo group consists at least partly of phenyl). The condensation reaction at this time is assumed to take place in the following manner when the reaction of diphenyldichlorosilane and boric acid is taken up as an example.

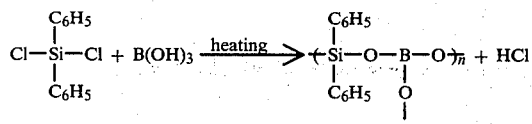

When the phenyl-containing polyborosiloxane is to be produced by the aforesaid reaction, the diorganodichlorosilane is preferably diphenyldichlorosilane and/or methylphenyldichlorosilane, or a mixture of any of these with dimethyldichlorosilane.

The phenyl-containing polyborosiloxane can also be produced by a dealcoholization-condensation reaction of boric acid and at least one diorganodialkoxysilane, or a deetherification-condensation reaction of a boric acid ester such as $B(OCH_3)_3$ and a diorganodialkoxysilane (the organo group consists at least partly of phenyl groups).

Since the condensation reaction in the various methods described above is fairly complicated, the structure of the phenyl-containing polyborosiloxane as a condensate cannot be completely determined. It is assumed however that the polyborosiloxane is composed mainly of a structural unit of the formula

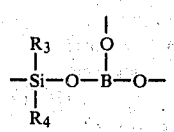

and a number of these structural units are combined complicatedly to form the polymer.

In the polyborosiloxane used as one starting material in the process for producing the polycarbosilane of this invention, the side chains bonded to a silicon atom ($R_3$ and $R_4$ in the above formula) should consist at least partly of phenyl groups. A preferred polyborosiloxane is the one in which at least 50% of the entire side-chains bonded to Si in the polymer consists of phenyl groups, and the balance being lower alkyl groups such as methyl and/or hydrogen.

Examples of the phenyl-containing polyborosiloxane are shown below. These examples are for the purpose of facilitating the understanding of the invention, and do not limit the invention.

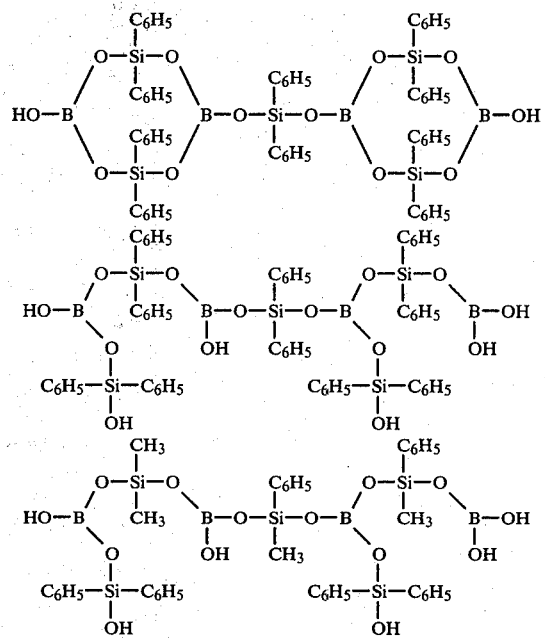

In addition to polyborosiloxanes having a linear, branched or cyclic structure such as those shown above, those of a complicated structure resulting from the crosslinking of these polyborosiloxanes are also included within the phenyl-containing polyborosiloxane used in this invention.

The phenyl-containing polyborosiloxanes usually have a number average molecular weight to 500 to 10,000 and are characterized by excellent hydrolysis resistance and thermal stability. For example, polyborodiphenylsiloxane having a molecular weight of 2350 has a decomposition temperature of 300° C.

According to the process for producing the polycarbosilane in this invention, at least one polysilane having a structural unit of the formula

is mixed with 0.01 to 15% by weight of the phenyl-containing polyborosiloxane, and the mixture is heated in an atmosphere inert to the reaction thereby inducing polymerization.

The important advantage of this process is that it does not require a special apparatus for heat-polymerizing the mixture, and for example, a simple apparatus as shown in FIG. 1 can be used.

In FIG. 1, the reaction apparatus consists of an ordinary heating furnace a such as an electric furnace, a refluxing device b of hard glass adapted to use cooling water, a reactor c made of quartz or stainless steel, a flow inlet $d_i$ for a gas inert to the reaction, and a flow outlet $d_o$ for the gas.

According to this process of manufacture, polycarbosilane having superior properties can be synthesized by using a simple apparatus including a heating furnace, a reactor, and a reflux device. It does not require a special apparatus such as a pressure reactor or a circulating-type apparatus as in the conventional processes for producing polycarbosilane.

In this process, the polymerization reaction under heat must be carried out in an atmosphere of a gas inert to the reaction. If the polymerization reaction should be carried out in an oxidizing atmosphere such as air, the starting polysilane will be oxidized, and the reaction will not proceed sufficiently. Nitrogen, argon and hydrogen are especially preferred as the gas inert to the reaction.

Generally, it is preferred to perform the polymerization reaction at atmospheric pressure or at pressures near it. If the polymerization reaction is carried out in vacuum or under highly reduced pressures, the resulting low-molecular-weight compounds distill out of the system, and the yield of the product decreases markedly. It is also preferred that the polymerization reaction be carried out while feeding the inert gas as a stream into the reaction zone. This maintains the pressure inside the reactor substantially at atmospheric pressure, and prevents the increase of the pressure caused by a gas such as methane which is released during the reaction.

The heating temperature is usually at least 250° C., preferably 300° C. to 500° C., which temperature is lower than those employed in the conventional processes. If the reaction temperature is below 250° C., the polymerization does not easily proceed. If it is above 500° C., the side-chain portion of the resultant polycarbosilane begins to be dissipated gradually. Another important advantage of the present invention is that the heat-polymerization ends within relatively short periods of usually 3 to 10 hours. Even when the heating is continued for more than 10 hours, no substantial improvement in the resulting polycarbosilane is noted.

The polycarbosilane obtained by the polymerization described above can be purified by dissolving it in a solvent, filtering the solution, and then evaporating the solvent. If required, it may be distilled at atmospheric or reduced pressure at a temperature of 50° to 450° C. to increase the average molecular weight of the product. Examples of such a solvent include n-hexane, benzene, xylene, and tetrahydrofuran.

The novel feature of the polycarbosilane of this invention is that polycarbosilane is produced from a mixture of polysilane and a small amount of the phenyl-containing polyborosiloxane. The use of such a novel mixed starting material is believed to bring about the advantage that no special reaction apparatus is required, and the heating temperature can be relatively low, and the heating time can be short. The theoretical aspect of the mechanism of bringing about such an advantage by adding a small amount of the phenyl-containing polyborosiloxane to polysilane will be described below. This, however, is a mere speculation, and does not in any way limit the present invention.

Polysilane as one starting material in the process of this invention decomposes at a temperature of 150° to 250° C. As a result, low-molecular-weight polysilane,

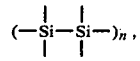

low-molecular-weight carbosilane,

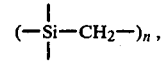

or a low-molecular-weight product consisting of a mixture of these is formed. When the temperature is further increased and reaches 200° to 300° C., heat cleavage of the B—O bond of the phenyl-containing polyborosiloxane takes place partly, and the low-molecular-weight product is bonded to the cleaved portion to form an intermediate. Since the formation of this intermediate reduces steric hindrance, it is presumably selective for low-molecular-weight compounds. It is believed that this intermediate, for example, has the following modes of linkage,

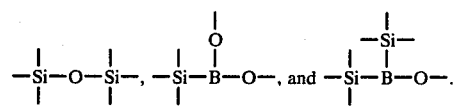

Since an intermediate having the linkage

is thermally unstable, when the heating temperature further increases to 250° to 500° C., it is converted to stable

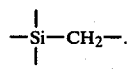

It is assumed that in this process, boron is dissociated and is released out of the reaction system as an alkyl boron

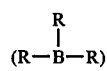

or boron hydride having a low molecular weight. Depending upon the polymerization temperature, however, there is a possibility that a part of boron will remain in a small amount in the polycarbosilane in the form of B—O—Si linkage.

When polysilane alone is used as a starting material, the low-molecular-weight compounds resulting from its heat decomposition are easily released out of the reaction system. In order to perform the polymerization reaction in good yields, the scattering of the low-molecular-weight compounds should be prevented by using a closed pressure vessel or a circulating-type apparatus adapted to recycle the low-molecular-weight compounds so as to gradually increase their molecular weights.

However, when a mixture of polysilane and polyborosiloxane is used as a starting material in accordance with the process of this invention, low-molecular-weight compounds formed by the heat decomposition of polysilane are captured by the cut portions of the B—O bond in the polyborosiloxane. This can effectively prevent the dissipation of the low-molecular-weight compounds out of the reaction system. Moreover, because polyborosiloxane produces a kind of catalytic effect on the reaction, the polymerization can be performed smoothly in high yields at atmospheric pressure and relatively low temperatures by using an open reaction vessel instead of using a special apparatus such as a closed pressure vessel or a special recycle device. As a result, polycarbosilane having a polymer skeletal structure composed partly of an Si—O bond is obtained.

In the process of this invention, the amount of the polyborosiloxane is 0.01 to 15% by weight based on polysilane. If the amount is less than 0.01%, the effect of capturing the low-molecular-weight compounds is not sufficient, and therefore, the amount of low-molecular-weight compounds to be released increases and the yield becomes poor. On the other hand, when the amount exceeds 15% by weight, the proportion of the Si—O bond in the resultant polycarbosilane increases, and therefore, the inherent properties and utility of the polycarbosilane are impaired. The suitable amount of the polyborosiloxane is 0.05 to 10% by weight.

The polymerization reaction in the process of this invention proceeds also by heating alone. If required, it may be carried out in the presence of a radical initiator such as benzoyl peroxide or a catalyst containing aluminum or boron, or under radiation.

Now, the polycarbosilane partly containing a siloxane bond obtained by this method will be described.

Figure 2:
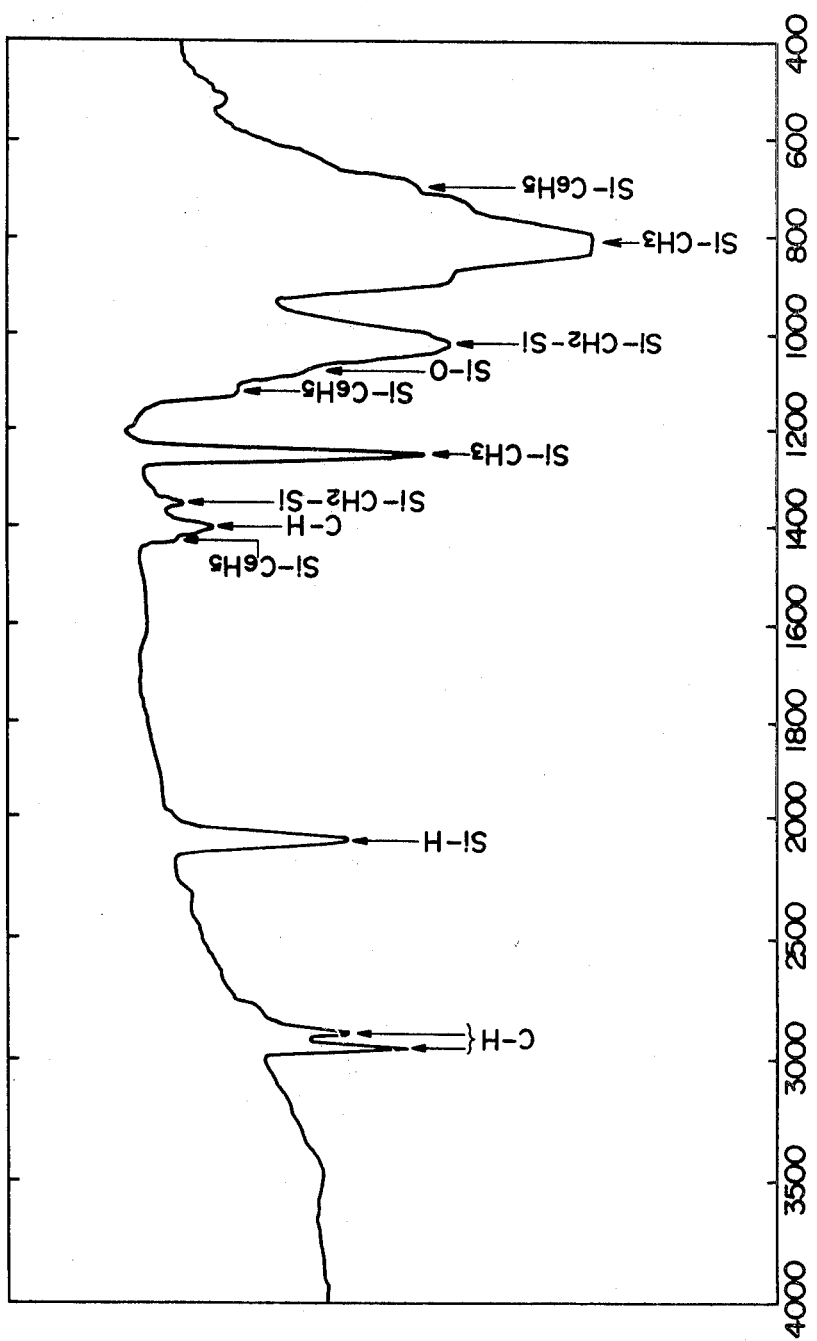
FIG. 2 is an IR absorption spectrum (KBr pellet method) of the polycarbosilane synthesized in Example 2.

As a typical example, polycarbosilane obtained by the method described in Example 2 given hereinbelow using polydimethylsilane as the starting polysilane will be taken up. As shown in FIG. 2 of the accompanying drawings, the IR absorption spectrum of this polycarbosilane shows absorptions ascribable to Si—CH₃ at near 800 cm⁻¹, and 1250 cm⁻¹; C—H at 1400, 2900 and 2950 cm⁻¹; Si—H at 2100 cm⁻¹; Si—CH₂—Si at 1020 and 1355 cm⁻¹; Si—O at near 1050 cm⁻¹; and Si—C₆H₅ at 700, 1120 and 1430 cm⁻¹. Absorptions ascribable to B—O—(Si) at 1340 cm⁻¹ or to B—OH at 3220 cm⁻¹ are difficult to detect by infrared absorption analysis.

The measurement of its ultraviolet absorption spectrum leads to the confirmation that the —Si—Si— component disappeared almost entirely.

Chemical analysis shows that the proportions of elements in this polymer are generally 30 to 60 Si, 20 to 60 C, 0.5 to 5 C, 5 to 10% of H, all by weight percent, and a trace of B.

From the results obtained by the IR spectrum, UV spectrum and chemical analysis, the following conclusion can be obtained as to the structure of the polycarbosilane of the invention partly containing siloxane bonds. The results of the IR spectrum show polycarboxilane to consist mainly of moieties

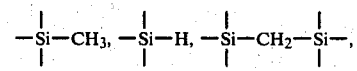

Also, the results of measurement of the ultraviolet absorption spectrum shows that it is substantially free from a

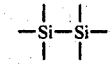

linkage. From these results, the polycarbosilane of this invention is determined to consist substantially of the following structural units (A) and (B).

wherein $R_1$, $R_2$, $R_3$ and $R_4$ each represent methyl, phenyl or hydrogen.

From the results of measurement of the proportions of elements by chemical analysis, the ratio of (A) to (B) has been determined to be from 5:1 to 200:1.

Furthermore, because the decomposition of polyborosiloxane takes place at the B—O bond, it is assumed that the structural unit (B) is distributed at random in the polycarbosilane, and the phenyl groups present as a side chain of Si in the polyborosiloxane remain as such.

Because only a limited number of procedures are available for the determination of the structure of a polymer at the present level of chemistry, it is extremely difficult to identify an accurate structure of a polymer having a complicated structure as the polycarbosilane obtained by the process of this invention. However, based on the above information, the structure of polycarbosilane obtained from polydimethylsilane and polyborodiphenylsiloxane as starting materials in the process of this invention is presumably as follows:

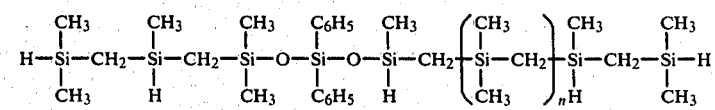

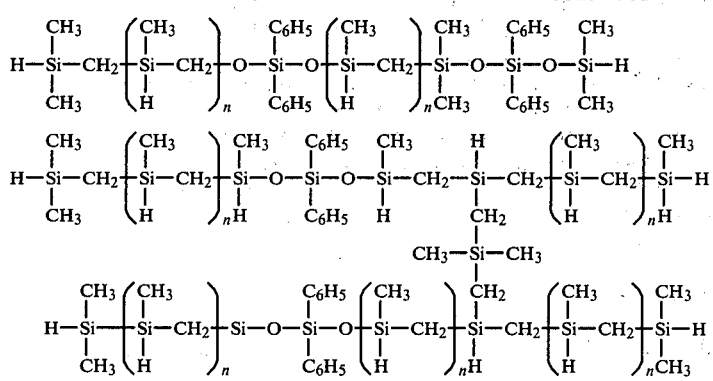

The polycarbosilane of this invention partly containing siloxane bonds usually have a number average molecular weight, measurded by a vapor pressure osmotic method, of 500 to 10,000 and an intrinsic viscosity of 0.01 to 1.50.

The polycarbosilane partly containing siloxane bonds of this invention have a higher decomposition temperature (ie, higher thermal stability), better oxidation resistance, and a higher residual ratio on firing than polycarbosilanes produced by the conventional processes. This fact is clear from the experimental results given in Table 1 below. Table 1 summarizes a comparison of the properties of polycarbosilane synthesized from polydimethylsilane in an autoclave in an atmosphere of argon at 470° C. under a final pressure of 110 atmospheres for 14 hours and polycarbosilane partly containing siloxane bonds synthesized from polydimethylsilane and 3.85% by weight of polyborodiphenylsiloxane in a stream of nitrogen at 400° C. for 5 hours by the process of this invention.

Table 1

| Items | Conventional polycarbosilane (synthesized under pressure) | Polycarbosilane containing siloxane bonds of the invention |
|---|---|---|
| Number average molecular weight | 1800 | 1720 |
| Decomposition temperature (°C.) | 310 | 350 |
| Increase by oxidation when the polymer is maintained at 200° C. in air for 1 hour (%) | 9.0 | 6.5 |
| Residual ratio on firing in argon gas at 1500° C. for 1 hour (%) | 49.8 | 73.9 |

The polycarbosilane of this invention is a thermoplastic material which is melted by heating to 50° to 300° C., and is soluble in solvents such as benzene, n-hexane, xylene and tetrahydrofuran. Hence, it can be shaped into articles of various configurations. By firing the shaped article at a temperature of at least 700° C., it can be converted to a shaped article composed mainly of an inorganic carbide SiC. Continuous fibers, films, coatings, and powders composed of silicon carbide are examples of such a shaped article. The polycarbosilane of this invention is especially suitable as a raw material for the production of continuous silicon carbide fibers. The process for producing continuous silicon carbide fibers from the polycarbosilane of this invention markedly remedies the defects associated with the process for producing continuous silicon carbide fibers from polycarbosilane obtained by a conventional method involving the use of a pressure reactor or a circulating-type apparatus which permits recycling, and thus makes it possible to produce continuous silicon carbide fibers having superior properties more easily and more economically.

The production of continuous fibers of silicon carbide will be described in detail below.

The first step in the process for producing continuous SiC fibers in accordance with this invention is a step of producing polycarbosilane partly containing siloxane bonds by the process for producing polycarbosilane in accordance with this invention. This step has been described in detail hereinabove.

The second step of this process is a step of preparing a spinning dope of the polycarbosilane obtained by the first step, and then spinning the dope. One specific procedure for performing the second step is to prepare a spinning dope by heating melting polycarbosilane, filtering the spinning dope to remove materials which will be detrimental to spinning, such as microgels and impurities, and then spinning the dope by a melt-spinning apparatus which is usually employed in the production of synthetic fibers. The temperature of the spinning dope being spnn differs according to the softening temperature of the starting polycarbosilane, but is advantageously within the range of 50° to 400° C. If desired, a spinning mantle is fitted to the spinning apparatus, and at least one gas selected from air, an inert gas, hot air, a hot inert gas, steam and ammonia gas is used as the atmosphere within the spinning mantle. By increasing the speed of take-up in this design, fine-denier fibers can be obtained. The speed of spinning in this melt-spinning process differs according to the average molecular wieght, molecular weight distribution and molecular structure of the starting polycarbosilane, but good results are obtained when it is within the range of 50 to 5,000 m/min.

Another procedure for practising the second step comprises dissolving polycarbosilane in a suitable solvent to form a spinning dope, filtering the dope to remove materials which will be detrimental to spinning such as microgels and impurities, and then spinning the dope by a dry spinning apparatus generally used in the production of synthetic fibers. Fine-denier fibers can be obtained by increasing the speed of take-up. Examples of solvents that can be used in this procedure are benzene, toluene, xylene, ethylbenzene, styrene, cumene, pentane, hexane, octane, cyclopentadiene, cyclohexane, cyclohexene, methylene chloride, chloroform, carbon tetrachloride, 1,1-dichloroethane, 1,2-dichloroethane, methyl chloroform, 1,1,2-trichloroethane, hexachloroethane, chlorobenzene, dichlorobenzene, ethyl ether, dioxane, tetrahydrofuran, methyl acetate, ethyl acetate, acetonitrile, and carbon disulfide.

In this procedure, a spinning mantle is fitted to the spinning apparatus, if desired. Solidification of the spun fibers within the spinning mantle can be controlled by using a mixture of a saturated vapor of at least one of the above solvents with at least one gas selected from air end inert gases, or a gas selected from air, inert gases, hot air, hot inert gases, steam, ammonia gas, hydrocarbon gases and organosilicon compound gases as the atmosphere within the spinning mantle.

The process for producing continuous fibers of silicon carbide in accordance with this invention has the advantage that in the second step the spinnability of the dope is better and the trouble of fiber breakage is less than the process of producing continuous silicon carbide fibers from polycarbosilane obtained by a conventional method. The reason for this is probably that since the polycarbosilane used in the process of this invention partly contains siloxane bonds as structural units, its molecular structure has higher linearity and lower chain rigidity than conventional polycarbosilanes, the orientation of molecules in the spun fibers becomes higher.

In addition to the above advantages, the process for producing continuous silicon carbide fibers of this invention has the following important advantages.

Polycarbosilane obtained by thermally decomposing polysilane by using a pressure reactor or a circulating-type apparatus that permits recycling has viscous flowability at room temperature. Hence, when it is used for production of silicon carbide fibers, it must be subjected to a step of removing low-molecular-weight compounds in the polycarbosilane before it is formed into a spinning dope. In a conventional process, too, polycarbosilane could be obtained as a normally solid substance instead of a viscous flowable substance. For example, normally solid polycarbosilane could be obtained by suitably selecting the polymerization conditions such as the polymerization temperature and time in a pressure reactor. However, the polymerization temperature in this case must be maintained at at least 500° C., and therefore the resulting solid polycarbosilane begins to decompose before it is melted. Accordingly, it is impossible to prepare a spinning dope by melting. Nor is it possible to form a solution of the solid polycarbosilane because there is no suitable solvent for this particular polymer. Accordingly, in the process involving the use of polycarbosilane obtained by a conventional process, a step of removing low-molecular-weight compounds in the polycarbosilane cannot be omitted.

In contrast, according to the process for producing continuous silicon carbide fibers of this invention, normally solid polycarbosilane can be easily obtained by suitably selecting the amount of the polycarbosiloxane and the polymerization temperature in the first step of producing the polycarbosilane from a mixture of polysilane and polyborosiloxane. The suitable amount of polyborosiloxane is 2 to 15% by weight, and the suitable polymerization temperature is 350° to 500° C.

When the amount of polyborosiloxane is small, it is preferred to increase the polymerization temperature. The resulting solid polycarbosilane can be easily formed into a spinning dope either by melting it under heat or by dissolving it in a solvent without removing low-molecular-weight compounds. Accordingly, the step of removing low-molecular-weight compounds in the polycarbosilane which is essential in the conventional processes can be omitted in the process of this invention. This is a significant advantage of the process of this invention.

The third step in the process for producing continuous silicon carbide fibers comprises subjecting the fibers spun in the second step to a treatment of rendering them infusible under tension or under no tension. The purpose of this treatment is to prevent fusing of the fibers on firing in the subsequent fourth step which will result in deformation or breaking of the fibers or the adhesion of the adjacent fibers.

One specific procedure for performing the treatment of the third step is to heat the fibers spun in the second step at a relatively low temperature in an oxidizing atmosphere under tension or under no tension. This heat-treatment forms a thin oxide coating on the surface of the fibers which protects the fibers, thereby achieving the purpose of this treatment. The oxidizing atmosphere used in this treatment may, for example, be an oxidizing gas such as air, oxygen, ozone, chlorine gas, bromine gas, ammonia gas, or a mixture of such gases, or an oxidizing auueous solution suuh as an aqueous solution of an inorganic peroxide (e.g., $KMnO_4$, $K_2Cr_2O_7$, $H_2O_2$). When the atmosphere of the oxidizing gas (except ozone) is used, the heating temperature is preferably within 50° to 400° C. because at less than 50° C., an oxide coating cannot be formed on the fibers, and at more than 400° C., the oxidation proceeds too much. In the use of ozone, this treatment can be performed at room temperature for over several minutes. The heating time is not critical, and can be varied over a wide range, for example from several minutes to 30 hours. Generally, the heating time depends on the heating temperature, and when the heating temperature is high, the heating time is preferably shortened. When the atmosphere of the oxidizing aqueous solution is used, the heating temperature is preferably from room temperature to 90° C., and the heating time is preferably from 0.5 to 5 hours. Generally, the use of the oxidizing gas as the oxidizing atmosphere is preferred to the oxidizing aqueous solution.

The distribution of the molecular weight of polycarbosilane obtained in the first step varies according to the synthesizing conditions. In some case, the content of low-molecular-weight compounds increases, and the softening temperature of the polycarbosilane may be lower than 50° C. In such a case, it is preferred to adjust the softening temperature of polycarbosilane to at least 50° C. by reducing the amounts of low-molecular-weight compounds by various methods to be described herinbelow. When fibers obtained by spinning polycarbosilane having a softening temperature of less than 50° C. are heated at a temperature of 50° to 400° C. in an oxidizing atmosphere to render them infusible, the shape of the fibers might be lost. Accordingly, only when polycarbosilane having a softening temperature of less than about 50° C. is obtained in the first step, a step of removing low-molecular-weight compounds in the polycarbosilane can be performed after the first step and before the second step. A typical procedure for performing this additional step comprises extracting the low-molecular-weight compounds in the polycarbosilane obtained in the first step by using a solvent such as alcohols (e.g., methanol or ethanol), or acetone to form polycarbosilane having a softening temperature of at least about 50° C.; or heating the polycarbosilane at a temperature of not more than 500° C. under reduced pressure or in a non-oxidizing atmosphere such as an inert gas to remove the low-molecular-weight compounds by distillation and therefore obtain polycarbosilane having a softening temperature of at least 50° C. Distillation in an oxidizing gas atmosphere in the latter procedure is undesirable because polycarbosilane will be oxidized, decomposed, or gelled. Heating temperatures above 500° C. should be avoided because the decomposition of polycarbosilane will be vigorous.

Another procedure for performing the treatment of the third step comprises subjecting the fibers spun by the second step to the irradiation of $\gamma$-rays or electron beams in a non-oxidizing atmosphere under tension or under no tension while optionally heating them. Irradiation of $\gamma$-rays or electron beams further polymerizes the polycarbosilane, thus achieving the purpose of this treatment.

Irradiation of $\gamma$-rays or electron beams can be performed at room temperature in a non-oxidizing atmosphere such as an inert gas or vacuum. The suitable irradiation dose is $10^6$ to $10^{10}$ roentgens. This can also be carried out in an oxidizing gas atmosphere such as air, ozone, oxygen, chlorine gas, bromine gas, ammonia gas, or a mixture of these. If further required, irradiation can be performed while heating at a temperature of 50° to 200° C. This results in the formation of a thin oxide coating on the surface of the spun fibers and can render them infusible within shorter periods of time. When $\gamma$-ray or electron beam irradiation is used to render the fibers infusible, polycarbosilane obtained in the first step is only required to be solid at room temperature. If polycarbosilane having viscous flowability is obtained in the first step, it must be transformed into a normally solid product by removing low-molecular-weight compounds by the solvent extraction or distillation described hereinabove.

When the treatment of the third step is carried out under no tension, the fibers will assume a wavy configuration because of shrinkage. This can sometimes be corrected in the subsequent firing step, and the application of tension in the third step is not essential. When the treatment of the third step is performed under tension, the magnitude of the tension may be the one at least sufficient to prevent the shrinkage of the fibers which will render the fibers wavy in configuration. Generally, tensions within the range of 1 to 500 g/mm$^2$ are preferred because under a tension of less than 1 g/mm$^2$, the fibers cannot be maintained taut, and under a tension of more than 500 g/mm$^2$, the fibers may be broken.

The fibers which have been thus rendered infusible by the third step of the process for producing continuous silicon carbide fibers of this invention are characterized by the fact that their tensile strength and elongation are much higher than those of fibers obtained by spinning polycarbosilane obtained by a conventional process using a pressure reactor or a circulating-type apparatus which permits recycling and then rendering the spun fibers infusible by the same treatment. This brings about the advantage that the infusible fibers are easy to handle, and in the firing operation in the fourth step, the breaking of the fibers is reduced, and therefore the yield of silicon carbide fibers increases.

The fibers obtained by spinning polycarbosilane obtained by a conventional process and rendering the spun fibers infusible usually have a tensile strength of less than 3.0 kg/mm$^2$ and an elongation of less than 2%.

In contrast, fibers obtained by melt-spinning polycarbosilane having a number average molecular weight of 1,570 obtained in the first step of the process for producing silicon carbide fibers in accordance with this invention, heating the spun fibers in the air at a rate of 30° C./hour, and maintaining them at 190° C. for 0.5 hour have a tensile strength of 4.53 kg/mm$^2$ and an elongation of 16.37%. Fibers obtained by subjecting the aforesaid melt-spun fibers to the irradiation of $\gamma$-rays in the air at room temperature at a dose of $1.34 \times 10^6$ roentgens have a tensile strength of 3.86 kg/mm$^2$ and an elongation of 14.79%.

The high tenacity and elongation of the infusible fibers in accordance with this invention is due presumably to the high linearity and orientation of polycarbosilane molecules of the melt-spun fibers, which lead to polymerization or crosslinking mainly among the molecules upon the treatment of the spun fibers to render them infusible, and therefore to the increase of the elastic properties of the infusible fibers.

The fourth step of the process for producing continuous silicon carbide fibers of this invention comprises firing the infusible fibers obtained in the third step to convert the polycarbosilane mainly to silicon carbide.

The firing is carried out in vacuum or in an atmosphere of an inert gas at 800° to 1800° C. with or without tension. By this firing, the polycarbosilane forming the fibers undergoes heat polycondensation and heat decomposition to release easily volatile components. Volatilization of the volatiles is the greatest at a temperature in the range of 500° to 700° C. At about 700° C. and above, conversion of the polycarbosilane to an inorganic material is vigorous, and at about 800° C., this conversion is presumed to be substantially complete. It is necessary therefore to perform the firing at a temperature of at least 800° C. The upper limit to the firing temperature is desirably 1800° C. to attain superior fiber strength. The preferred firing temperature is 1,000° to 1,500° C.

As stated hereinabove, the polycarbosilane partly containing siloxane linkages which is prepared in the first step of the process for producing silicon fibers in accordance with this invention has a far higher residual ratio on firing than polycarbosilanes produced by conventional methods using a pressure reactor or a circulating-type apparatus that permits recycling. This brings about the advantage that the yield of the fired fibers by the process of this invention is far higher than in the process for producing continuous silicon carbide fibers from polycarbosilanes obtained by conventional processes.

Usually, the fibers shrink and bend during the firing in the fourth step. To prevent bending, it is preferred to perform the firing under tension. The magnitude of the tension to be exerted at this time is the one at least sufficient to prevent the fibers from shrinking into a wavy configuration by the heat of firing. For practical purposes, good results can be obtained by exerting a tension in the range of 0.001 to 5 kg/mm$^2$. Under a tension of less than 0.001 kg/mm$^2$, the fibers cannot be maintained taut. When a tension of more than 5 kg/mm$^2$ is exerted, the fibers may sometimes be broken. The firing may be carried out in a plurality of stages with different atmospheres, temperatures, times and other heating conditions.

The process consisting of the first to the fourth steps described hereinabove can usually afford continuous fibers composed mainly of silicon carbide having superior properties. Sometimes, however, the fired fibers contain impurities including graphite, free carbon or silica which may cause the reduction and variation of the tensile strength of the fibers. If required, therefore, the fired fibers may be subjected to an additional step of removing the impurities.

One procedure for removing the impurities from the fired fibers comprises dipping the fibers in an impurity removing agent to dissolve the impurities in it. In this procedure, the impurities contained in the fired fibers can be dissolved by dipping them in an acid such as sulfuric acid, nitric acid, a mixture of sulfuric acid and nitric acid, hydrochloric acid, a mixture of nitric acid and hydrochloric acid, a sulfuric acid-acidified solution of potassium bichromate, a sulfuric acid-acidified solution of potassium permanganate, hydrofluoric acid, a mixture of hydrofluoric acid and nitric acid, or a mixture of hydrofluoric acid and sulfuric acid. Silica in the impurities can also be dissolved by using another type of impurity-remover which is a molten salt such as NaOH, borax, $Na_2CO_3$, $K_2CO_3$, $K_2CO_3/Na_2CO_3$, $Na_2SO_4$, $KNO_2$, NaCl, $KClO_3$, $Na_2O_2$ or $K_2CO_3/KNO_3$. Furthermore, phosphoric acid may be used to dissolve free carbon.

Among the impurity-removing agents illustrated above, hydrofluoric acid-acidified solutions such as hydrofluoric acid (HF), a mixture of hydrofluoric acid and nitric acid ($HF/HNO_3$) and a mixture of hydrofluoric acid and sulfuric acid ($HF/H_2SO_4$) are especially preferred because they are chemically inert to SiC which is the chief ingredient of the fired fibers and can dissolve only $SiO_2$ without any deleterious effect. The time required to remove $SiO_2$ at this time is desirably 10 minutes to 50 hours when the fiber diameter is 10 to 20 micrometers, although this varies according to the temperature of the hydrofluoric acid-acidified solution. For example, when a solution consisting of 50% HF and conc. sulfuric acid in a ratio of 1:1 and having a temperature of 90° C., the required time is about 3 hours.

Another procedure for removing impurities contained in the fired fibers comprises firing the spun fibers at more than 1000° C. in the fourth step, and heating the resulting fired fibers at a temperature of preferably 800° to 1600° C. in an atmosphere of at least one gas selected from oxygen, air, ozone, hydrogen, steam and carbon monoxide, thereby to remove free carbon in the impurities. When this decarbonization treatment is performed at a temperature of not more than 800° C., free carbon cannot be fully removed. When the heating temperature exceeds 1600° C., the reaction of SiC and the atmospheric gas takes place vigorously. The heating time is longer when the heating temperature is lower, and may be shorter when the heating temperature is higher. Better results can be obtained however when the heating is carried out at a relatively low temperature for a relatively long period of time because it reduces the amount of the reaction product between the atmospheric gas and SiC.

It is not always necessary to exert a tension in the decarbonization treatment. However, when the fibers are heat-treated at a high temperature under a tension of 0.001 to 100 kg/mm$^2$, continuous silicon carbide fibers of reduced bending and high strength can be obtained. Tensions of less than 0.001 kg/mm$^2$ are not effective, and even when a tension of more than 100 kg/mm$^2$ is applied, the effect does not increase.

Now, the characteristics of the continuous silicon carbide fibers obtained by the process described hereinabove are described below in detail.

Figure 3:
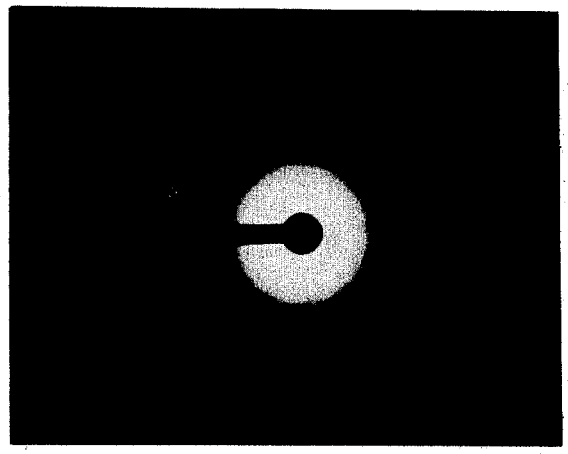
FIG. 3 is an X-ray diffraction photograph of the continuous silicone carbide fibers obtained by firing at 1400° C. in vacuum which is obtained by the Laue's method.

The continuous silicon carbide fibers produced by the process of this invention are formed mainly of ultrafine particles of amorphous SiC and/or $\beta$-SiC crystals. An X-ray diffraction analysis shows that when the polycarbosilane spun-fibers are fired in vacuum at a temperature of 1100°, 1300° and 1500° C., the average particle diameter of the crystals of the fibers is about 20 Å, 30 Å and 80 Å, respectively. It has also been found that the proportion of the crystals in the fibers increases as the firing temperature is higher. For example, the X-ray diffraction profile of continuous silicon carbide fibers prepared by firing in vacuum at 1400° C. have three diffraction peaks at $2\theta = 36°$, 60° and 72°, and this shows that $\beta$-SiC crystals are the chief ingredient of these fibers. FIG. 3 of the accompanying drawings shows a Laue's photograph of these fibers fired at 1400° C. measured by the X-ray transmission Laue's method. The innermost diffraction ring in the Laue's photograph is ascribable to the (111) plane of $\beta$-SiC, and diffraction spots are not seen in the diffraction rings. It is clear from this that the $\beta$-SiC crystals are very small particles.

When the firing temperature is higher than 1500° C. in the process for producing continuous silicon carbide fibers in accordance with this invention, the average particle size of the crystals in the fibers increases, and the strength of the fibers decreases gradually. The very high strength of the continuous silicon carbide fibers of this invention is due presumably to the fact that they are composed of ultrafine crystals. Specifically, since a local concentration of stress disperses through a high density crystal grain boundary, the fibers do not easily deform. Furthermore, since the crystals are ultrafine, there is no room in the crystal particles for the existence of dislocation required for deformation. Because the crystal particle size is very small, the apparent surface tension of the crystal particles increases exceedingly, and resistance to deformation increases. Moreover, since the surface of the silicon carbide fibers is smooth without raised or depressed portions, there is no concentration of stress on the raised or depressed portions, thus obviating the reduction of strength.

Figure 4:
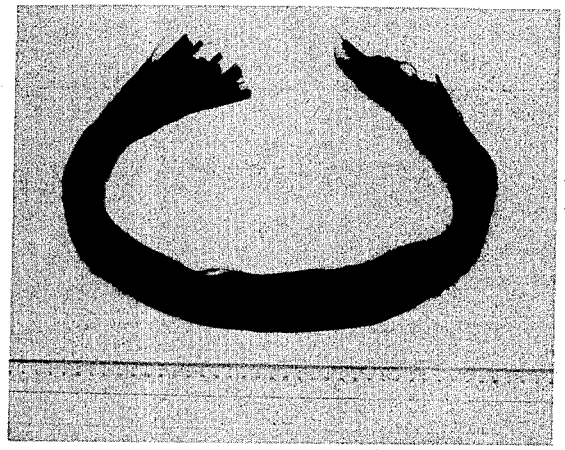
FIG. 4 is a photograph of the continuous silicon carbide fibers of this invention fired at 1300° C.

Before firing, the infusible fibers have a high elongation and a high tensile strength and are pliable. Thus, when the fibers are fired continuously in the subsequent firing step while being wound up on a winder in an atmosphere of nitrogen, breaking of the fibers is very much reduced, and continuous fibers of reduced fuzz can be obtained. FIG. 4 shows a photograph of a mass of aligned continuous silicon carbide fibers, cut to a size of about 62 cm, of the invention obtained by firing at 1300° C. One interval in the scale at the bottom of FIG. 4 corresponds to 1 cm.

The proportions of elements of the silicon carbide fibers obtained by the process of the invention, which are determined by chemical analysis, are generally 50 to 70% by weight of Si, 30 to 40% by weight of C, 0.01 to 10% by weight of O, and 0 to 0.01% by weight of H. The content of B cannot be detected on the accuracy level of chemical analysis, but a spectral analysis method shows that the content of B is several tens to several hundred ppm, and usually less than 500 ppm.

The continuous silicon carbide fibers in accordance with this invention have a tensile strength of 200 to 500 kg/mm$^2$, a Young's modulus of 15 to 40 tons/mm$^2$ and a specific gravity of 2.3 to 3.1. Because they are composed mainly of SiC, they have superior acid resistance, oxidation resistance and thermal stability, better wetting with metals and alloys than carbon fibers, and low reactivity with metals and alloys. These silicon carbide fibers find extensive applications either as such or as reinforcing materials in, for example, fiber-reinforced metals, plastics and rubbers, fibrous heaters, fire-retardant cloths, acid-resistant diaphragms, atomic reactor materials, airplane structural materials, bridges, structural building materials, nuclear fusion furace materials, rocket materials, abrasive cloths, wire ropes, marine exploiting materials, golf shafts, ski stocks, tennis rackets, fishing rods, and shoe soles.

Finally, polysilane suitable for use as a material for the production of polycarbosilane, and a process for its production will be described.

As stated hereinabove, polycarbosilane is produced by a conventional method which comprises heat-polymerizing polysilane in a pressure reactor, and the use of polydimethyl silane as the polysilane is considered most desirable. The present inventors have now found that a polysilane containing phenyl groups as part of the side chains is superior to polydimethylsilane, and a substantially linear polysilane having a skeletal structure of the formula

with the side chains consisting of 1 to 50% of phenyl groups and the balance being methyl groups (in which n is 5 to 100), a molecular weight of 350 to 13,000 and a decomposition initiating temperature in a non-oxidizing atmosphere of at least 200° C. (to be referred to as polymethylphenylsilane) is suitable as the polysilane used in the above process.

For example, the polymethylphenylsilane obtained by the method described in Example 10 shows an IR absorption spectrum which have an absorption based on C—H at 1400, 2900, 2950 cm$^{-1}$; an absorption based on Si—CH$_3$ at 635, 750, 835, 1250 cm$^{-1}$; and an absorption based on O—H at 3450 cm$^{-1}$. These absorptions correspond with absorptions observed with regard to polydimethylsilane. In addition to these absorptions, this polymethylphenylsilane also shows an absorption based on Si—C$_6$H$_5$ at 700, 1000, 1030, 1100, 1190, 1430, 1485, 1585 and 3060 cm$^{-1}$.

The ultraviolet absorption spectrum of this polymethylphenylsilane has an absorption maximum at 815 nm to 346 nm, and as a whole, shows a broad absorption over the region of 285 nm to 400 nm. This quite differs from the UV absorption spectrum of

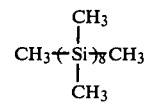

which shows an absorption maximum at 272.5 nm, the UV absorption spectrum of octaphenylcyclotetrasilane which shows an absorption maximum at 270 nm, and the UV absorption spectrum of

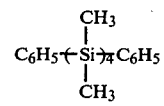

which shows an absorption maximum at 250.5 nm.

Polymethylphenylsilane usually contains OH as a terminal group, and the proportions of elements determined by chemical analysis are 20 to 50% by weight of Si, 40 to 70% by weight of C, 1.0 to 5.5% by weight of O, and 6 to 12% by weight of H.

Examples of the polymethylphenylsilane are given below.

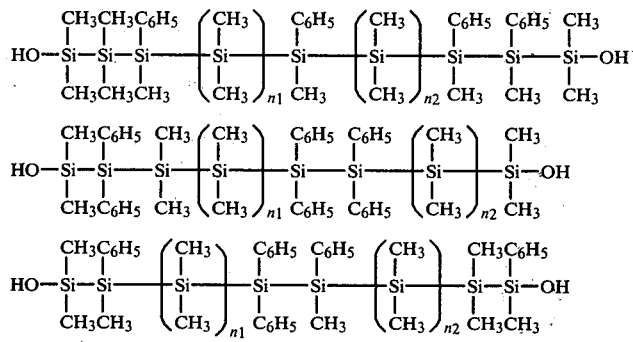

The heat-decomposition behavior of the polymethylphenylsilane specified in this invention is unique over known polysilanes, and this is one reason for which it is advantageously used as a raw material for the production of polycarbosilane. This is clearly seen from FIG. 6 which shows the TGA (thermogravimetric analysis) curves of three polysilanes.

Figure 6:
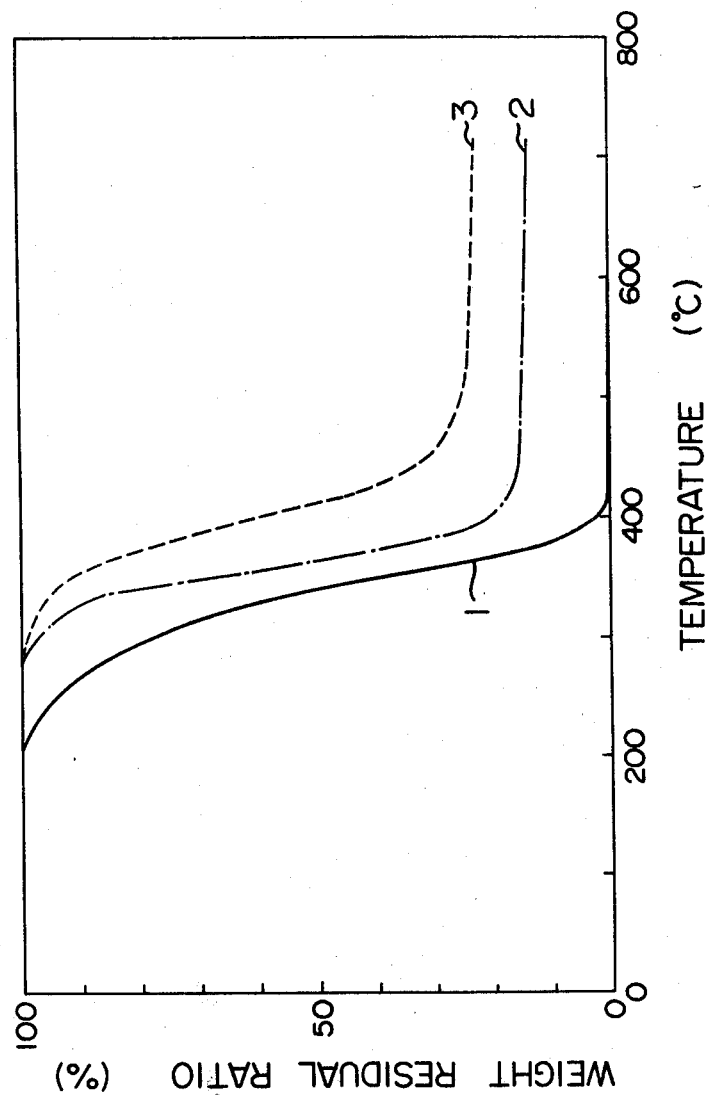
FIG. 6 shows TGA curves of the polymethylphenylsilane synthesized in Example 10 (curve 2), polydimethylsilane (curve 1), and octaphenylcyclotetrasilane (curve 3).

FIG. 6 shows the TGA curves, measured in a nitrogen stream at a flow rate of 50 cc/min. and at a temperature raising rate of 5° C./min., of polymethylphenylsilane produced by the method described in Example 10 to be given hereinbelow from a mixture of 54% by weight of dimethyldichlorosilane and 46% by weight of diphenyldichlorosilane (curve 2), polydimethylsilane synthesized from dimethyldichlorosilane alone (curve 1), and octaphenylcyclotetrasilane synthesized by the method disclosed by Jarvie, Winkler, Peterson, Gilman: J. Am. Chem. Soc., 83, 1921 (1961) (curve 3). These curves in FIG. 6 show that the decomposition initiation temperature of polymethylphenylsilane is higher than that of polydimethylsilane (namely, has higher thermal stability), and the temperature at which the heat decomposition ends is almost the same for both. Because of this heat-decomposition behavior of polymethylphenylsilane, when it is heat-polymerized to polycarbosilane in a pressure reactor, the formation of low-molecular-weight polycarbosilane at low temperatures can be inhibited. Accordingly, when heat polymerization is carried out under the same conditions, polycarbosilane having a higher average molecular weight than is the case of polydimethylsilane can be obtained.

When polymethylphenylsilane is used as a starting material, the phenyl groups bonded as side-chain groups to Si are contained as side-chain groups of Si of the resulting polycarbosilane. The phenyl groups bonded to Si have higher heat decomposition resistance and higher oxidation stability than methyl groups. Accordingly, polycarbosilane prepared from the polymethylphenylsilane in accordance with this invention has better thermal stability, better oxidation resistance and a higher residual ratio on firing at high temperatures then polycarbosilane prepared from polydimethylsilane, as shown in Example 11 to be given hereinbelow.

The phenyl group content of the polymethylphenylsilane specified in this invention is limited to 1 to 50% of the entire side-chain groups because if its content is below 1%, the effect of including phenyl groups is small, and if it is more than 50% by weight, it is difficult to form polycarbosilane by heat decomposition.

The polymethylphenylsilane can be conveniently produced by using one of the following starting materials (I) to (V), (I) $(CH_3)(C_6H_5)SiCl_2$,
(II) a mixture of 1 to 70 mole% of $(CH_3)(C_6H_5)SiCl_2$ and the remainder being $(CH_3)_2SiCl_2$,
(III) a mixture consisting of 1 to 50 mole% of $(C_6H_5)_2SiCl_2$ and the remainder being $(CH_3)_2SiCl_2$,
(IV) a mixture of (I) and (II),
(V) a mixture of (II) and (III), mixing it with at least one metal selected from sodium, lithium and potassium, and heating the mixture to induce dechlorination and polymerization.

The reaction is preferably carried out in an inert solvent such as anhydrous xylene or anhydrous toluene. An inert gas is a suitable gaseous atmosphere in which the reaction is to be carried out. Nitrogen and argon are especially suitable. The use of a dry gas is preferred because the formation of siloxane bonds by moisture can be prevented.

Preferably, the heating temperature is such that at least the initial heating temperature is not more than 150° C. The reaction proceeds at a temperature below the melting point of the dechlorinating metal. Heating to above the melting point of the metal is preferred because the reaction surface area of the metal can be increased by stirring and the reaction is markedly accelerated. The melting points of lithium, sodium and potassium are 180.5°, 97.8°, and 63.7° C., respectively. Lithium should be used in chip form so as to increase its reaction surface area. Potassium consists of bulky atoms, and therefore, the rate of reaction is low. Sodium is especially suitable because it can be dissolved in the aforesaid solvent and by stirring the solution, its reaction surface area can be easily increased.

It is preferred that during the reaction, the starting material and metal be sufficiently mixed by stirring, and the dissipation of the unreacted material or solvent be prevented by refluxing during heating.

The sufficient amount of the dechlorinating metal is 1.01 to 1.10 times the amount which is required to convert all chlorine in the starting material into a chloride. The polymerization reaction in this process ends in 8 to 30 hours.

By the above heating, dechlorination and polymerization take place, and a precipitate is formed. A solid obtained by filtering the precipitate is polymethylphenylsilane. The solid product, however, frequently contains ONa attached to its terminals, or the unreacted Na and NaCl, KCl, or LiCl as a reaction product adhering to the product. Na can be removed by washing with an alcohol such as methanol or ethanol. NaCl can be removed by washing with water. This procedure results in the termination of the polymer only at OH groups. Polymethylphenylsilane can be obtained as a white powder.

When the starting material in the process of this invention is either one of (II) to (V), the amount of at least one monosilane containing phenyl groups, i.e. $CH_3C_6H_5SiCl_2$ or $(C_6H_5)_2SiCl_2$, in the starting material should be limited to at least 1 mole%. When the starting material (II) is used, the amount of $CH_3C_6H_5SiCl_2$ should be adjusted to not more than 70 mole%. When the starting material (III) is used, the proportion of $(C_6H_5)_2SiCl_2$ should be adjusted to not more than 50 mole%.

The following Examples illustrate the present invention in more detail.

EXAMPLE 1

A 5-liter three-necked flask was charged with 2.5 liters of anhydrous xylene and 400 g of sodium, and they were heated to the boiling point of xylene in a stream of nitrogen gas. One liter of dimethyldichlorosilane was added dropwise over the course of 1 hour. After the addition, the mixture was heated under reflux for 10 hours to form a precipitate. The precipitate was collected by filtration, and washed with methanol and then with water to afford 420 g of polydimethylsilane as a white powder.

Separately, 759 g of diphenyldichlorosilane and 124 g of boric acid were heated to 100° to 120° C. in n-butyl ether to afford a white resinous product. The product was heated in vacuum at 400° C. for 1 hour to afford 530 g of polyborodiphenylsiloxane.

Then, 0.125 g of polyborodiphenylsiloxane was mixed with 250 g of polydimethylsilane, and the mixture was heated in a stream of nitrogen to 320° C. in a 2-liter quartz tube equipped with a reflux tube and polymerized for 3 hours to form polycarbosilane partly containing siloxane bonds. The reaction product was allowed to cool to room temperature, and n-hexane was added. The solution was taken out, and n-hexane was evaporated. It was concentrated in vacuo by heating it to 280° C. to afford 84 g of a solid. The solid was soluble in benzene and had an average molecular weight of 960 and an intrinsic viscosity of 0.02. The solid product was then fired in an atmosphere of nitrogen by heating it to 1300° C. at a rate of 5° C./min. It showed a residual ratio of 45%.

EXAMPLE 2

Two hundred and fifty (250) grams of the same polydimethylsilane as used in Example 1 was mixed with 10.0 g of the same polyborodiphenylsiloxane as used in Example 1. The mixture was heated in a stream of nitrogen to 370° C. in the same apparatus as in Example 1, and polymerized for 5 hours to afford polycarbosilane partly containing siloxane bonds. The reaction product was allowed to cool to room temperature, and n-hexane was added. The solution was taken out, and n-hexane was evaporated to afford 176 g of a solid. The solid was soluble in benzene and had an average molecular weight of 1720 and an intrinsic viscosity of 0.04. The solid product was fired by heating it in an atmosphere of nitrogen to 1300° C. at a rate of 5° C./min. The product showed a residual ratio of 79%. The IR absorption spectrum of the resulting polycarbosilane is shown in FIG. 2 of the accompanying drawings.

EXAMPLE 3

A 5-liter three-necked flask was charged with 2.5 liters of anhydrous xylene and 400 g of sodium, and they were heated to the boiling point of xylene in a stream of nitrogen. A mixture of 965 g of dimethyldichlorosilane and 34.7 g of diphenyldichlorosilane was added dropwise over the course of 1.4 hours. After the addition, the mixture was heated under reflux for 18 hours to form a precipitate. The precipitate was collected by filtration, and washed first with methanol and then with water to afford 414 g of polysilane as a white powder in which the side chains of Si consisted of 2% of phenyl groups and the remainder being methyl groups.

The same polyborodiphenylsiloxane (8.0 g) as used in Example 1 was added to 250 g of the resulting polysilane, and the mixture was heated to 360° C. in a stream of nitrogen in the same way as in Example 1, and polymerized for 7 hours to form polycarbosilane partly containing siloxane bonds. The reaction product was allowed to cool to room temperature, and n-hexane was added. The solution was taken out, and n-hexane was evaporated to afford 213 g of a solid. The solid product was soluble in benzene and had an average molecular weight of 3,500 and an intrinsic viscosity of 0.06. The solid product was fired by heating it in an atmosphere of nitrogen to 1300° C. at a rate of 5° C./min. The product showed a residual ratio of 88%.

EXAMPLE 4

To 250 g of the same polydimethylsilane as used in Example 1 was added 8.27 g of the same polyborodiphenylsiloxane as used in Example 1. The mixture was heated to 370° C. in a 2-liter quartz tube fitted with a reflux tube, and polymerized for 6 hours to afford polycarbosilane partly containing siloxane bonds. The reaction product was allowed to cool to room temperature, and benzene was added. The solution was taken out, filtered, and benzene was evaporated to afford 140 g of solid polycarbosilane.

Using a melt-spinning apparatus, the polycarbosilane was melted at 335° C., and melt-spun into the air at a spinning speed of 500 m/min. from a spinneret having an orifice diameter of 300 $\mu$m to form fibers having a diameter of 13$\mu$. The resulting fibers were heat-treated in the air under no tension from room temperature to 190° C. over a period of 6 hours, and maintained at 190° C. for 0.5 hour to render them infusible. The infusible fibers had a tensile strength of 4.53 kg/mm$^2$ and an elongation of 16.37%. The infusible fibers were fired by heating them in a stream of nitrogen gas (flow rate 100 cc/min.) under no tension to 1300° C. over the course of 13 hours, and maintaining them at 1300° C. for 1 hour. The resulting fibers had a diameter of about 12$\mu$, a tensile strength of 275 kg/mm$^2$, and a modulus of elasticity of 20 tons/mm$^2$.

EXAMPLE 5

To 250 g of the same polydimethylsilane as used in Example 1 was added 8.54 g of the same polyborodiphenylsiloxane as used in Example 1. The mixture was heated to 355° C. in a 2-liter quartz tube equipped with a reflux tube, and polymerized for 8 hours to afford polycarbosilane partly containing siloxane bonds. The reaction product was allowed to cool to room temperature, and 200 ml of n-hexane was added. The solution was taken out, and filtered, and n-hexane was evaporated to afford 133 g of solid polycarbosilane.

The polycarbosilane was melted at 300° C., and melt-spun into the air at a spinning speed of 500 m/min. from a spinneret having a diameter of 300 $\mu$m to form fibers having a diameter of 10$\mu$. The fibers were heated from room temperature to 190° C. over the course of 6 hours in the air while applying a tension of 50 g/mm$^2$, and maintained at 190° C. for 0.5 hour to render them infusible. The infusible fibers had a tensile strength of 4.60 kg/mm$^2$ and an elongation of 14.980%. The infusible fibers were heated to 1300° C. over the course of 13 hours under no tension in vacuum ($3 \times 10^{-3}$ mmHg), and maintained at 1300° C. for 1 hour. The resulting fibers had a diameter of about 9$\mu$, a tensile strength of 302 kg/mm$^2$ and a modulus of elasticity of 27 tons/mm$^2$.

EXAMPLE 6

To 250 g of the same polydimethylsilane as used in Example 1 was added 8.27 g of the same polyborodiphenylsiloxane as used in Example 1. The mixture was heated to 350° C. in a 2-liter quartz tube equipped with a reflux tube, and polymerized for 6 hours to afford polycarbosilane partly containing siloxane bonds. The reaction product was allowed to cool to room temperature, and benzene was added. The solution was taken out and filtered, and benzene was evaporated to afford 152 g of solid polycarbosilane.

The resulting polycarbosilane was dissolved in benzene to form a solution having a concentration of 40% by weight. The solution was dry-spun under the following conditions. A spinneret with an orifice diameter of 250 $\mu$m was used, and the inside of the spinning mantle was filled with an air atmosphere containing benzene at a partial pressure of 0.01 atm. The solution was spun at a spinning speed of 200 m/min. and a temperature of 80° C. to form fibers having a diameter of 20$\mu$. The fibers were subjected to the irradiation of $\gamma$-rays in the air at a dose of $1.34 \times 10^6$ roentgens under no tension to render them infusible. The infusible fibers had a tensile strength of 3.86 kg/mm$^2$ and an elongation of 16.37%. The infusible fibers were heated to 800° C. over the course of 8 hours in vacuum ($3 \times 10^{-3}$ mmHg) under a tension of 100 g/mm$^2$, further heated to 1300° C. over the course of 2 hours, and maintained at 1300° C. for 1 hour. The resultant fibers had a diameter of about 18$\mu$, a tensile strength of 320 kg/mm$^2$ and a modulus of elasticity of 25 tons/mm$^2$.

EXAMPLE 7

To 250 g of the same polydimethylsilane as used in Example 1 was added 8.27 g of the same polyborodiphenylsiloxane as used in Example 1. The mixture was heated to 360° C. in a 2-liter quartz tube equipped with a reflux tube, and polymerized for 10 hours to afford polycarbosilane partly containing siloxane bonds. The reaction product was allowed to cool to room temperature, and benzene was added. The solution was taken out and filtered, and benzene was evaporated to afford 150 g of solid polycarbosilane.

The polycarbosilane was melted at 340° C., and spun into the air through a spinneret having an orifice diameter of 300 μm at a spinning speed of 700 m/min. to afford fibers having a diameter of 8μ. Under a tension of 50 g/mm$^2$, the fibers were heated from room temperature to 110° C. over the course of 12 hours, and maintained at 110° C. for 0.1 hour to render them infusible. The infusible fibers had a tensile strength of 5.01 kg/mm$^2$ and an elongation of 17.25%. The infusible fibers were heated in vacuum ($3 \times 10^{-3}$ mmHg) under a tension of 100 g/mm$^2$ up to 1300° C. over the course of 13 hours, and maintained at 1300° C. for 1 hour. Furthermore, the resultant fibers were dipped for 20 hours in a 1:1 mixture of 50% HF and conc. sulfuric acid at room temperature, washed with water, and maintained at 1300° C. for 3 hours in the air to form continuous silicon carbide fibers. The fibers had a diameter of 7μ, a tensile strength of 396 kg/mm$^2$, and a modulus of elasticity of 33 tons/mm$^2$.

EXAMPLE 8

A 5-liter three-necked flask was charged with 2.5 liters of anhydrous xylene and 400 g of sodium, and they were heated to the boiling point of xylene in a stream of nitrogen gas. A mixture of 982 g of dimethyldichlorosilane and 17.5 g of diphenyldichlorosilane was added dropwise over the course of 1 hour. After the addition, the mixture was heated under reflux for 12 hours to form a precipitate. The precipitate was collected by filtration, and washed first with methanol and then with water to afford 389 g of polysilane in which the side chains of Si consisted of 1% of phenyl groups and the remainder being methyl groups.

To 250 g of this polysilane was added 7.73 g of the same polyborodiphenylsiloxane as used in Example 1. The mixture was heated to 340° C. in a 2-liter quartz tube equipped with a reflux tube, and polymerized for 5 hours to form polycarbosilane partly containing siloxane bonds. The reaction product was allowed to cool to room temperature, and benzene was added. The solution was taken out and filtered, and benzene was evaporated. It was concentrated in vacuum to 280° C. to afford 132 g of solid polycarbosilane.

The polycarbosilane was melted at 290° C., and melt-spun into the air through a spinneret having an orifice diameter of 250 μm at a spinning speed of 800 m/min. to afford fibers having a diameter of 8μ. The fibers were subjected to the irradiation of γ-rays at a dose of $1.56 \times 10^6$ roentgens in the air at 50° C. under no tension to render them infusible. The infusible fibers had a tensile strength of 3.81 kg/mm$^2$ and an elongation of 10.10%. The infusible fibers were heated to 1300° C. over the course of 6.5 hours under a tension of 50 g/mm$^2$ in a stream of nitrogen (at a flow rate of 100 cc/min.), and maintained at 1300° C. for 1 hour to fire them. The fired fibers had a diameter of 7.5μ, a tensile strength of 350 kg/mm$^2$ and a modulus of elasticity of 28 tons/mm$^2$.

EXAMPLE 9

To 250 g of the same polysilane as used in Example 3 in which the side chains of Si consisted of 2% of phenyl groups and the remainder being methyl groups was added 9.34 g of the same polyborodiphenylsiloxane as used in Example 1. The mixture was heated to 350° C. in a 2-liter quartz tube equipped with a reflux tube, and polymerized for 6 hours to afford polycarbosilane partly containing siloxane bonds. The reaction product was allowed to cool to room temperature, and benzene was added. The solution was taken out, and filtered, and benzene was evaporated to afford 169 g of solid polycarbosilane.

The polycarbosilane was melted at 305° C., and melt-spun into the air through a spinneret having an orifice diameter of 250 μm at a spinning speed of 750 m/min. to afford fibers having a diameter of 8μ. While applying a tension of 50 g/mm$^2$, the fibers were heated from room temperature to 75° C. over the course of 15 hours in the air, and maintained at 75° C. for 1 hour to render them infusible. The infusible fibers had a tensile strength of 405 kg/mm$^2$ and an elongation of 13.86%. The infusible fibers were heated in vacuum ($3 \times 10^{-3}$ mmHg) under a tension of 100 g/mm$^2$ up to 1300° C. over 13 hours, and maintained at 1300° C. for 1 hour to fire them. The fired fibers had a diameter of 7μ, a tensile strength of 426 kg/mm$^2$ and a modulus of elasticity of 32 tons/mm$^2$.

EXAMPLE 10

Figure 5:
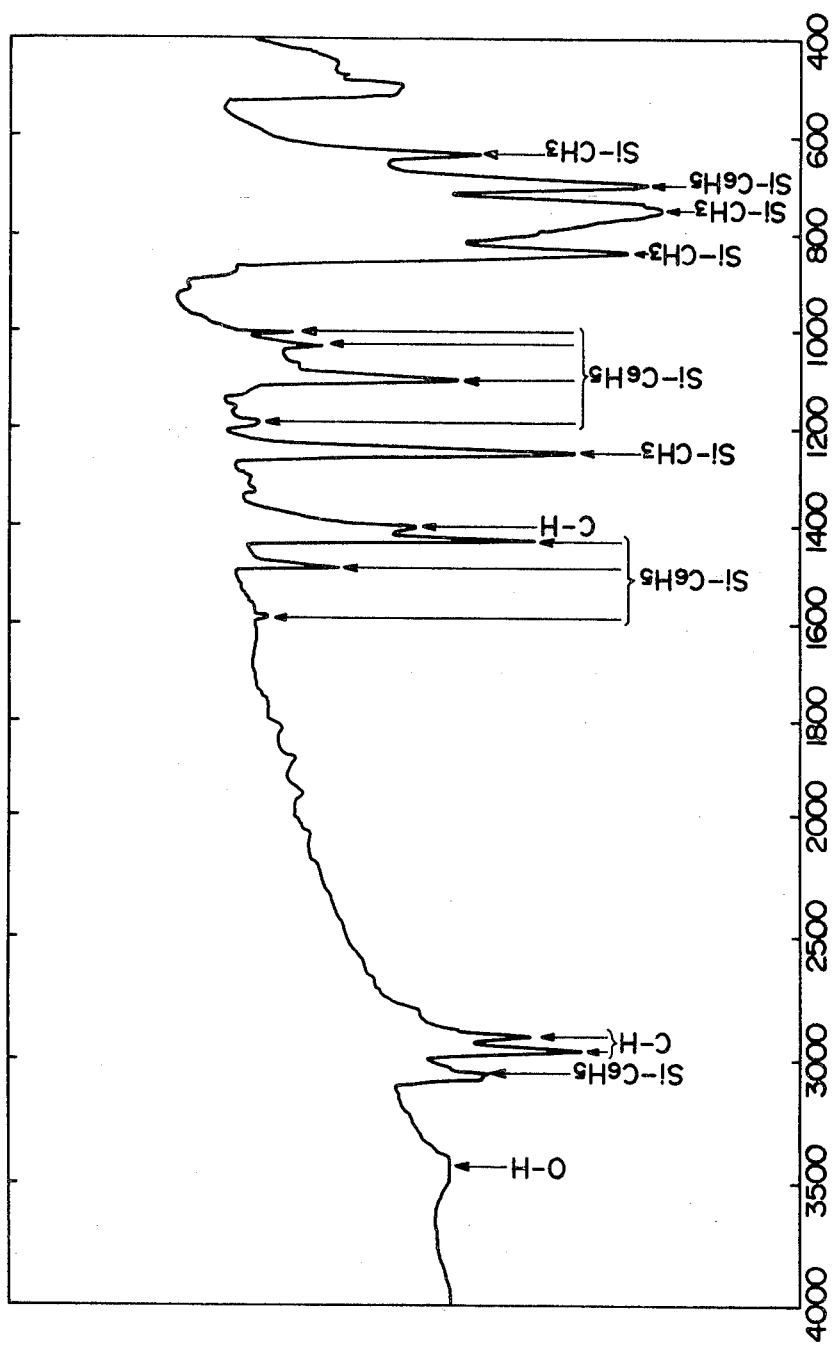
FIG. 5 is an IR absorption spectrum (KBr pellet method) of the polymethylphenylsilane synthesized in Example 10.

A 5-liter three-necked flask was charged with 2 liters of anhydrous xylene and 300 g of metallic sodium, and they were heated to the boiling point (136° C.) of xylene in a stream of nitrogen gas. A mixture of 540 g of dimethyldichlorosilane and 460 g of diphenyldichlorosilane was added dropwise at a rate of 0.3 liter/hour from a 1-liter dropping funnel. After the addition, the mixture was heated under reflux for 18 hours to afford a blue violet precipitate. The precipitate was collected by filtration and washed first with methanol and then with water to afford 470 g of polymethylphenylsilane in which the side chains of Si consisted of 30% of phenyl groups and the remainder being methyl groups. The IR absorption spectrum of this product is shown in FIG. 5 of the accompanying drawings. The UV absorption spectrum of this product showed an absorption maximum at 330 nm.

By a thermogravimetric analysis of this product in a nitrogen gas stream at a flow rate of 50 cc/min. and a temperature raising rate of 5° C./min. up to a temperature of 700° C., the product was found to have a decomposition initiating temperature of 280° C., a decomposition ending temperature of 400° C. and a residual weight ratio of 14%, as shown in FIG. 6.

For comparison, FIG. 6 also shows the TGA curves of polydimethylsilane (curve 1) and octaphenylcyclotetrasilane (curve 3).

EXAMPLE 11

A 5-liter three-necked flask was charged with 2.5 liters of anhydrous xylene and 380 g of metallic sodium, and they were heated to the boiling point of xylene in a stream of nitrogen. A mixture of 960 g of dimethyldichlorosilane and 100 g of diphenyldichlorosilane was added dropwise at a rate of 1 liter/hour through a 1-liter dropping funnel. After the addition, the mixture was heated under reflux for 12 hours to form a bluish violet precipitate. The precipitate was collected by filtration and washed first with methanol and then with water to afford 450 g of polymethylphenylsilane as a white powder in which the side chains of Si consisted of 5% of phenyl groups and the remainder being methyl groups. The UV absorption spectrum of this product had an absorption maximum at 340 nm. The product was heated to 700° C. at a rate of 5° C./min. in a stream of nitrogen at 50 cc/min. to perform its thermogravimetric analysis. It was found that the product had a decomposition initiating temperature of 216° C., a decomposition ending temperature of 390° C., and a residual weight ratio of 0.6%.

A 2-liter autoclave was charged with 250 g of this polymethylphenylsilane, and reacted at 450° C. for 14 hours. The reaction product was dissolved in n-hexane and taken out of the autoclave. The solution was filtered, and concentrated by heating it to 250° C. by using a vacuum pump to afford 145 g of polycarbosilane (A). By a similar procedure, 250 g of polydimethylsilane was reacted at 470° C. for 14 hours, and the product was concentrated by heating it to 280° C. to afford 140 g of polycarbosilane (B). The properties of the polymers (A) and (B) are tabulated below for easy comparison.

| Products | (A) | (B) |
|---|---|---|
| Number average molecular weight | 1490 | 1520 |
| Decomposition initiating temperature (°C.) | 340 | 300 |
| Weight increase (%) by oxidation after maintaining the product in the air at 200° C. for 1 hour | 6.2 | 9.1 |
| Residual ratio (%) on firing in argon gas at 1500° C. for 1 hour | 64.4 | 43.6 |

EXAMPLE 12

A 5-liter three-necked flask was charged with 2.5 liters of anhydrous toluene and 370 g of metallic sodium, and they were heated at the boiling point of toluene in a stream of nitrogen. A mixture of 858 g of dimethyldichlorosilane and 210 g of methylphenyldichlorosilane was added dropwise at a rate of 1 liter/hour. After the addition, the mixture was heated under reflux for 15 hours to form a bluish violet precipitate. The precipitate was collected by filtration, and washed first with methanol and then with water to afford 385 g of polymethylphenylsilane in which the side chains of Si consisted of 7.7% of phenyl groups and the remainder being methyl group. The UV absorption spectrum of this product had an absorption maximum at 338 nm.

By a thermogravimetric analysis of the product involving heating it to 700° C. at a rate of 5° C./min. in a stream of nitrogen at a flow rate of 50 cc/min, it was found that this product had a decomposition initiating temperature of 222° C., a decomposition ending temperature of 392° C. and a residual weight ratio of 2.4%.

What we claim is:

1. A process for producing polycarbosilane partly containing siloxane bonds, which comprises adding 0.01 to 15% by weight of polyborosiloxane having phenyl groups in at least a part of the side chains of Si with its skeletal structure being composed of B, Si and O to a polysilane having the structure

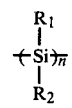

wherein n is at least 3, and $R_1$ and $R_2$, independently from each other, represent methyl, ethyl, phenyl or hydrogen;

and heating the polymer mixture in an atmosphere inert to the reaction thereby to polymerize it.

2. The process of claim 1 wherein both $R_1$ and $R_2$ are methyl groups.

3. The process of claim 1 wherein at least 50% of the side-chain $R_1$ and $R_2$ groups consists of methyl groups, the remainder being phenyl groups and/or hydrogen.

4. The process of claim 1 wherein at least 50% of the side-chain groups bonded to Si of the polyborosiloxane consists of phenyl groups, the remainder being lower alkyl groups and/or hydrogen.

5. The process of claim 1 wherein the heating temperature is from 250° to 500° C.

6. Polycarbosilane partly containing siloxane bonds having superior thermal stability and oxidation resistance and a high residual ratio on firing in a non-oxidizing atmosphere, said polycarbosilane being composed mainly of structural units (A) and (B) below,

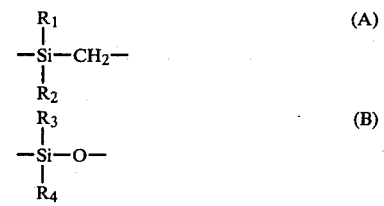

wherein $R_1$, $R_2$, $R_3$ and $R_4$, independently from each other, represent methyl, ethyl, phenyl or hydrogen, the ratio of (A):(B) being from 5:1 to 200:1, and having a number average molecular weight of 500 to 10,000 and an intrinsic viscosity of 0.01 to 1.50.

7. A process for producing polysilane having phenyl groups as a part of the side chains, which comprises mixing one monosilane selected from (I) $(CH_3)(C_6H_5)SiCl_2$, (II) a mixture of 1 to 70 mole% of $(CH_3)(C_6H_5)SiCl_2$ and the balance being $(CH_3)_2SiCl_2$, (III) a mixture of 1 to 50 mole% of $(C_6H_5)_2SiCl_2$ and the balance being $(CH_3)_2SiCl_2$, (IV) a mixture of (I) and (II), and (V) a mixture of (II) and (III) with at least one metal selected from sodium, lithium and potassium, and heating the mixture to induce dechlorination and polymerization.

* * * * *